United States Patent
Wegman

(10) Patent No.: US 6,448,965 B1
(45) Date of Patent: Sep. 10, 2002

(54) VOICE-CONTROLLED IMMERSIVE VIRTUAL REALITY SYSTEM

(75) Inventor: Edward J. Wegman, Burke, VA (US)

(73) Assignee: George Mason University, Fairfax, VA (US)

( * ) Notice: Subject to any disclaimer, the term of this patent is extended or adjusted under 35 U.S.C. 154(b) by 0 days.

(21) Appl. No.: 09/336,313

(22) Filed: Jun. 18, 1999

Related U.S. Application Data

(60) Provisional application No. 60/089,982, filed on Jun. 19, 1998.

(51) Int. Cl.$^7$ ................................................ G06T 17/00
(52) U.S. Cl. ........................................................ 345/419
(58) Field of Search ................................ 345/419, 418, 345/420, 433

(56) References Cited

U.S. PATENT DOCUMENTS

| | | | |
|---|---|---|---|
| 6,166,748 A | * 12/2000 | Van Hook et al. | 345/522 |
| 6,222,540 B1 | * 4/2001 | Sacerdoti | 345/339 |
| 6,259,460 B1 | * 7/2001 | Gossett et al. | 345/552 |

\* cited by examiner

*Primary Examiner*—Cliff N. Vo
(74) *Attorney, Agent, or Firm*—David S. Grossman; Richard Lebovitz

(57) ABSTRACT

The present invention relates to systems and methods for generating and displaying an immersive three-dimensional visual environments. In preferred aspects of the invention, the system uses a central processing unit which contains a low-cost commodity chip. The immersive system can further comprise a voice recognition component which is utilized to manipulate the visual environment.

8 Claims, No Drawings

VOICE-CONTROLLED IMMERSIVE VIRTUAL REALITY SYSTEM

This application claims priority of U.S. Provisional No. 60/089,982, filed Jun. 19, 1998.

SUMMARY OF THE INVENTION

The present invention relates to a novel systems, devices, apparatus, and methods, for generating, displaying and interacting with dynamic three-dimensional images, especially images that can be displayed to produce a virtual reality-type environment. The imaging system is comprised of multiple components which collectively interact to produce a desired computer-generated virtual reality environment. Some unique features of the invention can include:

- a computer operating with a rich instruction-set circuit architecture, including a complex instruction-set circuit (CISC) chip, such as a Pentium II processor, improvements thereof, hybrids thereof, and other low-cost commodity chips;
- a synchronization signal generator means which can place the output of multiple central processing units (CPU), and associated graphical processors, in temporal register with each other, enabling the transmission and reception of coordinated information by multiple, autonomous computers;
- a liquid crystal display projector means for projecting graphic images produced and transmitted by a computer; and/or
- a new human-computer interaction metaphor for virtual reality using a voice recognition input and output means to permit users to input data via voice, or other audio signals, and to permit users to receive output by computer-generated audio signals.

Below is a description of the various components or modules of the present invention.

A. Computing and Processing Means

Multiple computers containing central processing units (CPU) means and, optionally graphics processor (GP) means, are focal components of the voice-controlled immersive reality systems. The combination of multiple computers, each producing stereoscopic images independently, is a feature of the system. The computers are used to transmit stereoscopic graphical information (e.g., in the form of electrical or light signals) to a projector means which translates the information into visual images that are displayed on a display screen means. The graphical information can be transmitted directly to the projector, or it can be transmitted to a secondary processor means, which processes the signal and then relays the processed signal to the projector means.

The "screen" on which the information is displayed can be any desired surface or object, including surfaces which are flat, curved, textured, or three-dimensional. A preferred form of transmission of the graphical information is in the form of a time-sequential (left-eye, right-eye) stereoscopic image signal, but is not limited to this method. Images can be projected directly on a screen, or they can be projected from behind the screen, e.g., using a silver-type screen.

The computers are also used to transmit synchronization signals to a signal emitter means which controls the synchronization of stereoscopic images of the viewer means.

The transmitted graphical information can be retrieved from a sub-component of the computers, a distant storage medium via computer networking, or it can be generated is dynamically by the computer, itself. The graphical information is generated by computer code based on internal components of the software itself, or by software manipulation of data such as numerical or CAD data stored on the computer's storage medium or accessed from remote sites via computer networks, or by interaction of two or more autonomous virtual reality systems via computer networking each system providing the other with stereoscopic images.

In a preferred embodiment of the invention, computer based on CISC chip design architecture available as commodity electronic hardware, such as a Pentium® II processor, can be used to generate the graphic display. Such chips are usually contrasted with RISC chips which are usually regarded as faster. The use of CISC chips not only lowers cost, but provides a richer instruction set, making programming easier and more versatile. However as CISC and RISC technology converge, incorporating substantially similar features and technologies, the distinctions between the two have diminished. See, e.g., Prosise, PC Magazine, Oct. 24, 1995, for a discussion of RISC and CISC chips. Thus, the present invention can be utilized with hybrid chips which consolidate the advantageous structural and functional aspects of each, including, rich instruction sets, use of higher level operating systems, and superscalar pipeline performance allowing simultaneous multiple execution of instruction. In a preferred embodiment of the invention, the CISC, CISC/RISC hybrids, improvements, etc., hardware architecture is used in conjunction with the Microsoft Windows NT software operating system as contrasted with the UNIX operating system. Widely available application programming interfaces (API) make the combined hardware-software system particularly effective for this invention.

B. Synchronization Signal Generator Means

When multiple computers are used to generate and display the three-dimensional environment on a screen, a mechanism is required to synchronize the independent computers. Temporal synchronization is necessary to align images generated by autonomous, multiple, computers so that the viewer is confronted with a continuous display which mimics the real world. Synchronization is needed at two levels. First, synchronization must be achieved so that images displayed by the projector means are in sufficiently close temporal alignment so that blending of the images is achieved as perceived by the human visual system. This synchronization requires that the images displayed by each projector means be no more than $1/100^{th}$ of 1 second delayed from fastest to slowest image. We designate this type of synchronization as "image lock." Second, synchronization between the time-sequential images for left eye and right eye is required so that all projector means display left-eye information simultaneously and similarly display right-eye information simultaneously. The required synchronization is within approximately $1/150^{th}$ of 1 second. We designate this type of synchronization as "stereo lock."

A synchronization signal generator is achieved by sub-processes running under a multiprocessor operating system on the multiple independent computers communicating via ethernet or similar computer networking scheme with speed capabilities of at least two megabits per second. One of the independent computers for the system is designated as the "master" and the others are designated as the "slaves." The stereo lock is achieved by master computer, broadcasting a message via the computer network connection to each of the slave computers indicating which of the left or right eye images are to be displayed. This message need only contain a single bit of information plus routing overhead which is limited to a single packet of information. A packet containing 64 bytes or 512 bits would be available in less than $3/10,000^{th}$ of 1 second on a two megabit per second computer network easily within the $1/150^{th}$ of 1 second requirement for stereo lock. The image lock synchronization works by having each slave computer reporting to the master computer when the slave computer has finished computing its current frame. Until each slave (and master) have completed computing the corresponding current frame, all computers display and re-display the previous frame. When the master computer has received messages from each slave computer that the next frame is computed, and when the master computer itself has completed the next frame computation, the master computer broadcasts a signal to all slave computers to display the next frame. The next frame packet is similar in size to the stereo lock packet so that switching to the next frame can occur within the same $3/10,000^{th}$ of 1 second time scale. The computation time of individual frames may vary depending on complexity of the image from $1/15^{th}$ of one second to $1/150^{th}$ of one second.

Upon achieving synchronization between the CPUs and associated GPs, each computer can transmit signals to a corresponding projector means and signal emitter means in a temporally and spatially coordinated manner.

C. Viewer and Signal Emitter Means

A signal emitter means is used to control the stereo lock synchronization of viewer means, enabling a user to view displayed images in three-dimensions. In one embodiment, the viewer means is a headset having separate and independent viewing fields for each eye, analogous to the lens of eyeglasses. Each viewing field can be viewed by means of a liquid crystal shutter. By alternating the opening and closing of the shutter for each eye, a two-dimensional image projected on to the display screen is viewed as a three-dimensional image. In one embodiment, infrared signals from the emitter trigger the liquid crystal lens on the headsets to open and close, alternating with each eye, to create a three-dimensional effect when processed by the brain. See, e.g., U.S. Pat No. 5,598,231.

Where multiple display screens are used, a synchronization signal generator is utilized to coordinate multiple signal emitters and the projected images.

D. Projector and Display Means

A projector means receives signals from a computer and processes it into an image that is displayed on a display screen means. In a preferred embodiment of the invention, the projector means is a liquid crystal display (LCD) projector. See, e.g., U.S. Pat. Nos. 5,642,927; 5,653,520; and 5,682,216; D371564. Liquid crystal display projectors can have inherent limitations imposed by the speed with which the color liquid crystal shutters can be cycled off and on, e.g., about 85 frames per second. A part of the novelty of the present invention is that the software operating under a Windows NT operating system, which limits frame rate to approximately 85 frames per second, 42.5 frames per second each eye, is compatible with the liquid crystal cycling speed.

In a preferred embodiment of the invention, the projector is a liquid crystal stereo projector, e.g., VR2210 (vrex). A computer, such as a Dell 450-Mhz Pentium II, generates image-rich signals which are tranmitted to the projector which displays the images on a silver screen. The visual output can be viewed with linear or circular polarized glass eyeset which are commercially available.

E. Voice Recognition and Communication Means

Standard human-computer interaction is by means of the desktop metaphor. In this mode of operation, various "windows" containing graphic, icon, or text information are presented on a two-dimensional screen as if they were sheets of paper sitting on a desktop. Control of the computer is by means of pointing and clicking using a mouse and keyboard. This mode of interaction is suitable for a two-dimensional environment, but inappropriate for a threedimensional environment. We include as part of this system a new metaphor involving voice interaction. Previous virtual reality systems have included instrumented gloves or wands with triggers that tend to mimic a three-dimensional version of the desktop metaphor. Because these are essentially means for interacting with two-dimensional windows in three-dimensional space, they tend to be awkward to use. In addition, the tracking required for position information on the glove or wand systems tend to be compute intensive and introduce time latency and position inaccuracy into the system, making so as to make the entire system suboptimal. In our system, a limited vocabulary is introduced analogous to the commands found in pull down menus in the desktop metaphor. Spoken commands replace the action of a mouse and keyboard. A unique software code layer interfaces standard applications such as the virtual reality and other graphical displays and the voice recognition software. The integration of voice recognition software and the stereoscopic application programs using our unique software interface constitutes a new human-computer operating metaphor.

In a preferred embodiment, the present invention relates to a system for generating and displaying a three-dimensional visual environment, comprising: a central processing unit operating, comprising a complex instruction-set processor and a graphics processor supporting open GL; a synchronization signal generator which is effective to place the output of multiple central processing units and associated graphical processors, in temporal register with each other, enabling the transmission and reception of coordinated information by multiple, autonomous computers; and a liquid crystal display stereo projector for projecting graphic images produced and transmitted by said central porcessing unit computer. A central processing unit can be a computer, such as a computer containing a CISC chip (e.g., a Pentium II 450 Mhz chip, improvements thereof, hybrids thereof). The central processing unit also can comprise a graphical card which comprises the hardware support for graphical language (GL). The aforementioned components are coupled together in a manner which is effective to produce the three-dimensional visual environment.

EXAMPLE

As explained above, an aspect of the invention is the integration of voice communication (input, recognition, data transfer, output) with the three-dimensional display to create a dynamic and interactive environment. In achieving this result, three independent modules can be used: a visual display or visualization module (described above); a voice recognition module, and a communication module which couples and facilitates integration of the visualization and voice recognition means, e.g., by transferring voice input from the voice recognition module to the display module. The visual display or visualization module is comprised of computing and processing means, synchronization signal generator means, viewer and signal emitter means, and projector and display means, each which are described above.

To demonstrate how such a system is designed and used, we have described an example which provides training for aircraft pilots by presenting various simulated conditions ("fly-through terrains") that may be confronted during flight. This is simply illustrative of the features of the present invention, and is not limiting in any way.

As described above, three-dimensional visualization can be achieved using LCD projector(s) and a LCD shutter lens set driven by one or more CPU processors. In the example, the system can used to generate a three-dimensional display of a fly-through terrain simulating any environment that a pilot might experience as viewed from the cockpit window of the aircraft or on internal instrument systems (e.g., altitude, radar, solar, infrared, energy, fuel, etc.). The displayed terrain can be retrieved from any database appropriately designed to simulate any desired environment.

The voice recognition module is selected to acquire voice or other audio input and translate the input into information that can be stored, copied, or transferred to other locations. Any voice recognition module means can be utilized, including commercially available products. An essential feature is the capability to detect and distinguish audio input, process it, and create an output in a form that can be specifically recognized by the visualization display module.

To create the interactive environment, output from the voice recognition module can be transferred to the visualization display module. Upon receipt of such input from the voice recognition module, a series of specifically designed instructions can be retrieved and used to alter or modulate the visual display.

Voice output can be retrieved in various ways. In one embodiment, the visualization module periodically, at prescribed intervals, monitors the system for output from the voice recognition module, analogously to a person reviewing his mailbox at designated times for the receipt of new messages. In another embodiment, output from the voice recognition module is transferred and stored in an intermediate location, a DLL. The visualization module queries the DLL at designated time intervals for messages; this is similar to the latter process, but has the added advantage of freeing up the voice recognition means to receive input continuously. In this manner, a series of audio commands can be stored and retrieved. In a third, but preferred, embodiment, the visualization display module is interrupt-driven. In this model, the visualization display runs continuously, retrieving and displaying information from the terrain database until output is received from the voice recognition module. This is preferred, e.g., since it eliminates unnecessary processing time and data storage, such as checking a mailbox that is not full.

Once a voice command is inputted into the voice recognition module, translated into a data string, it can be transferred to the visualization software, which can receive the input and respond appropriately. The system can be designed to recognize specific commands (voice mandamus). Transfer of the information can be achieved in various ways including, TCP/IP, PVM, or internally when the voice and visualization display modules are operating on the same processor.

In the fly-through example, a user wearing the LCD shutters views a three-dimensional terrain simulating a fly-through environment. He wears a headphone to receive audio input, and a microphone which receives voice or other audio input. If the user chooses to direct the aircraft to a different altitude, he can speak into the microphone, the voice mandamus "Up." This command is inputted into the voice recognition module via the microphone, which translates into a data string. The data string is transferred to the visualization module using a desired communication protocol, such as TCP/IP or PVM.

Upon receipt of the data string, the visualization module responds by retrieving a specific set of instructions which alters the visual display in the manner specified by the command.

Without further elaboration, it is believed that one skilled in the art can, using the preceding description, utilize the present invention to its fullest extent. The preceding preferred specific embodiments are, therefore, to be construed as merely illustrative, and not limiting of the remainder of the disclosure in any way whatsoever. The entire disclosure of all applications, patents and publications, cited above are hereby incorporated by reference.

What is claimed is:

1. A system for generating and displaying at least one three-dimensional stereoscopic image comprising:

a. at least two computers, each of said computers capable of generating at least one projection image, each of said computers including:
      i. a complex instruction-set processor; and
      ii. a graphics processor supporting open GL;
   b. a synchronization signal generator for providing temporal synchronization of said projection images generated by each of said computers using:
      i. an image lock synchronization mechanism; and
      ii. a stereo lock synchronization mechanism; and
   c. at least one liquid crystal display projector, each of said at least one liquid crystal display projectors capable of receiving and projecting at least one of said projection images synchronized by said synchronization signal generator.

2. A system according to claim 1, wherein each of said computers is coupled to one of said at least one liquid crystal display projector.

3. A system according to claim 1, further comprising a linear polarized glass eyeset for viewing said at least one three-dimensional stereoscopic image.

4. A system according to claim 3, wherein said linear polarized glass eyeset utilizes said stereo lock synchronization mechanism.

5. A system according to claim 1 further comprising a circular polarized glass eyeset for viewing said at least one three-dimensional stereoscopic image.

6. A system according to claim 5, wherein said circular polarized glass eyeset utilizes said stereo lock synchronization mechanism.

7. A system according to claim 1, further including a voice recognition module for converting audio input into system commands.

8. A system according to claim 1, wherein at least one of said at least one liquid crystal display projectors is a stereo liquid crystal display projector.

* * * * *

UNITED STATES PATENT AND TRADEMARK OFFICE
CERTIFICATE OF CORRECTION

PATENT NO. : 6,448,965 B1
DATED : September 10, 2002
INVENTOR(S) : Edward J. Wegman It is certified that error appears in the above-identified patent and that said Letters Patent is hereby corrected as shown below:

Column 1,
Line 6, insert the following:
-- STATEMENT REGARDING FEDERALLY SPONSORED RESEARCH OR DEVELOPMENT.
The U.S. Government has a paid-up license in this invention and the right in limited circumstances to require the patent owner to license others on reasonable terms as provided for by the terms of Grant No. DAAG-98-1-0404 awarded by the Department of the Army. --.

Signed and Sealed this

Thirtieth Day of May, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,448,965 B1 | |
| APPLICATION NO. | : 09/336313 | |
| DATED | : September 10, 2002 | |
| INVENTOR(S) | : Edward J. Wegman | |

It is certified that error appears in the above-identified patent and that said Letters Patent is hereby corrected as shown below:

Column 1, line 6, insert the following text:

-- STATEMENT REGARDING FEDERALLY SPONSORED RESEARCH OR DEVELOPMENT.

The U.S. Government has a paid-up license in this invention and the right in limited circumstances to require the patent owner to license others on reasonable terms as provided for by the terms of Grant No. DAAG-98-1-0404 awarded by the Department of the Army. --

Signed and Sealed this

Fifth Day of December, 2006

JON W. DUDAS
*Director of the United States Patent and Trademark Office*